United States Patent Office 2,995,432
Patented Aug. 8, 1961

2,995,432
SOLID COMPOSITE RUBBER BASE PROPELLANTS CONTAINING REINFORCING AGENT OF RESINOUS ALDEHYDE CONDENSATE
Boyce M. Corley and Otho D. Ratliff, Jr., McGregor, Tex., assignors to Phillips Petroleum Company, a corporation of Delaware
No Drawing. Filed Aug. 4, 1958, Ser. No. 753,160
14 Claims. (Cl. 52—.5)

This invention relates to solid propellant compositions. In one aspect, this invention relates to solid propellant compositions particularly adapted for use in gas generators.

In recent years, considerable work has been directed toward the development of solid propellants suitable for use in rocket motors and in other uses. Rockets employing solid propellant fuels are extensively used by the military and have also achieved considerable importance in commercial operations. For example, solid propellant compositions are utilized in missiles, in projectiles, and in rockets to assist planes in take-off or to furnish an extra surge of power in flight. A solid propellant to be satisfactory for its intended use should possess certain desirable physical characteristics. For example, the propellant should have a tensile strength and modulus of elasticity, and other physical properties commensurate with its intended use.

Recently, superior solid propellant materials have been discovered which comprise a solid oxidant such as ammonium nitrate or ammonium perchlorate, and a rubbery material, such as a copolymer of butadiene and a vinylpyridine or other substituted heterocyclic nitrogen base compound, which after incorporation is cured by a quaternization reaction or a vulcanization reaction. Solid propellant compositions of this nature and a process for their production are disclosed and claimed in copending application, Serial No. 284,447, filed April 25, 1952, by W. B. Reynolds and J. E. Pritchard.

In the production of solid propellants it is ordinarily desirable that said propellants have excellent mechanical properties such as high elongation, high tensile strength, and high modulus of elasticity. However, for some special purpose propellants, the mechanical properties are of secondary importance and can be relaxed in favor of the ballistic properties. This is frequently the situation where it is desired to use the propellant in relatively small missiles such as air to air missiles, ground to air missiles, stationary gas generators for starting devices, and other types of gas generators such as stage separation gas generators, etc.

The propellant compositions of this invention are particularly applicable to solid propellant compositions of the type described in the two preceding paragraphs. In such propellant compositions it is customary to utilize a reinforcing agent such as carbon black. We have now discovered that by using an uncured thermosetting resinous condensate of an aldehyde with another compound, such as a phenolic compound, urea, or melamine, that solid propellant compositions having physical and ballistic properties particularly suitable for use in gas generators are obtained.

Thus, broadly speaking, the present invention resides in the improvement of using said thermosetting resinous condensate materials as a reinforcing agent in solid propellant compositions comprising a solid oxidant component and a polymeric material as a binder component.

An object of this invention is to provide a new and improved propellant composition. Another object of the invention is to provide a propellant composition particularly adapted for use in gas generators. Still another object of this invention is to provide an improved reinforcing agent for use in solid propellant compositions comprising a solid oxidant component and a polymeric binder component. Other aspects, objects, and advantages of the invention will be apparent to those skilled in the art in view of this disclosure.

Thus, according to the invention there is provided a solid propellant composition comprising: a solid oxidizing salt as an oxidizer component; and a binder component comprised of: a copolymer of a conjugated diene with a heterocyclic nitrogen base; and an uncured thermosetting resinous condensate of an aldehyde with another compound such as a phenolic compound, urea, or melamine.

The thermosetting resins employed as reinforcing agents according to the invention can be any of the well-known classes of resins produced by condensing any aldehydic compound with any phenolic compound, with urea, or with melamine. These classes of resins are well-known to those skilled in the art. Suitable aldehydes include, among others, the following: formaldehyde, acetaldehyde, propionaldehyde, benzaldehyde, and the like.

The phenolic resins form a presently preferred class of thermosetting resins for use in the practice of the invention. Examples of phenolic compounds which can be condensed with said aldehydic compounds include, among others, the following: phenol itself, the ortho, para, and meta cresols; the xylenols, the dihydroxybenzenes, such as resorcinol; and the like. In preparing said phenolic resins, a phenolic compound is condensed with an aldehydic compound, generally in the ratio of about 0.75 to about 3 mols of aldehydic compound for each mol of phenolic compound. A presently preferred resin for use in the practice of the invention is one prepared by condensing phenol itself with formaldehyde. An example of such a resin is Schenectady Resin No. 6601 available commercially from the Schenectady Varnish Company of Schenectady, New York.

As is well-known to those skilled in the art, such phenolic resins are usually synthesized in the presence of catalysts. Said catalysts consist essentially of either a hydrogen ion yielding (acidic) or a hydroxyl ion yielding (basic) substance. Generally speaking, the acid condensed resins are preferred in the practice of the invention when it is desired to develop the highest possible tensile strength in the propellant composition. The base condensed resins are usually preferred where resistance to heat deterioration is the primary consideration in the final propellant composition. It is to be understood, of course, that both acid-condensed and base-condensed types of phenolic resins are suitable for use in the practice of the invention.

As is also well-known to those skilled in the art, the phenolic resins condense in several stages. A soluble resin is first formed which then passes successively to an insoluble but fusible resin, and then to a final insoluble and infusible resin. It should be understood that the condensation of the phenolic resins for use in the practice of this invention must not be carried beyond the fusible stage, because otherwise the materials cannot be properly incorporated into the rubbery copolymer of the binder component.

In urea-aldehyde resins, for example urea-formaldehyde resins, the production of such resins is based on the primary formation of methylol ureas by the reaction of formaldehyde with the amide groups on the urea molecule. Two mols of formaldehyde can react with one mol of urea to form dimethylol urea. The methylol ureas condense under slightly acid pH conditions with the liberation of water to produce resinous products. The mechanism is not positively established, but evidence indicates the formation of three-dimensional structure through methylene cross linkages. Said resins can be cured by the application of heat.

In the production of melamine-aldehyde resins, for example melamine-formaldehyde resin, one mol of melamine reacts with from one to six mols of formaldehyde to form methylol compounds. Said methylol compounds can condense to resinous products by mechanisms which are probably similar to those involved in the condensation of the methylol-ureas. Three-dimensional structures are probably created with the triazine rings probably crosslinked by methylene groups. The cure of the resins is accelerated by acids although they can be cured by heat alone under neutral or even slightly alkaline conditions.

The amount of the above-described thermosetting resins used in the practice of the invention is usually within the range of 10 to 60 parts by weight per 100 parts of copolymer.

The rubbery polymers employed as binders in the solid propellent compositions of this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML–4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

In the preparation of the copolymers, the amount of conjugated diene employed is in the range of 75 to 95 parts by weight per 100 parts of monomers and the heterocyclic nitrogen base is in the range of 25 to 5 parts.

The conjugated dienes employed are those containing from 4 to 10 carbon atoms per molecule and include 1,3-butadiene, isoprene, 2-methyl-1,3-butadiene, 2,3-dimethyl-1,3-butadiene, 2-methoxybutadiene, 2-phenylbutadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the preparation of the polymeric binders of this invention. Furthermore, instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

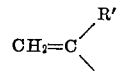

substituent wherein R' is either hydrogen or a methyl group. That is, the substituent is either a vinyl or an alpha-methylvinyl (isopropenyl) group. Of these, the compounds of the pyridine series are at present of the greatest interest commercially. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

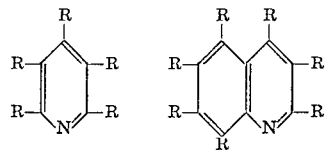

or

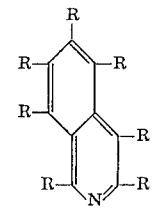

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-para-methylphenyl)-3-vinyl-4-methylpyridine;
3-vinyl-5-(hydroxyphenyl)-pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline;

and the like.

The binder component contains rubbery polymers of the type hereinbefore described, a reinforcing agent of the type described, and, in addition, there can be present one or more plasticizers, wetting agents, and antioxidants. Other ingredients which are employed for sulfur vulcanization include a vulcanization accelerator, a vulcanizing agent such as sulfur, and an accelerator activator, such as zinc oxide. The finished binder usually contains various compounding ingredients. Thus, it will be understood that herein and in the claims unless otherwise specified, the term "binder" is employed generically and includes various conventional compounding ingredients. The binder content of the propellant composition will usually range from 4 to 25 percent by weight of the total composition.

The rubbery copolymer comprising a conjugated diene and a polymerizable heterocyclic nitrogen base can also be cured by a quaternization reaction by incorporating therein a quaternizing agent and subjecting the resulting mixture to quaternizing conditions of temperature. Thus, the binder component can also contain a quaternizing agent. Suitable quaternizing agents include, among others, the following: alkyl halides such as methyl iodide, and methyl bromide; alkylene halides such as methylene iodide, and ethylene bromide; substituted alkanes such as chloroform, bromoform, and alkyl sulfates such as methyl sulfate; and various substituted aromatic compounds such as benzoyl chloride, methyl benzene sulfonate, benzo-trichloride, benzyl chloride, benzal chloride, para-xylene-hexachloride, and the like. The quaternizing temperature is usually in the range from 0 to 250° F., although temperatures outside this range can be used.

A general formulation for the binder component of the propellant composition of the invention is as follows:

| Ingredient: | Parts by weight |
|---|---|
| Bd/MVP copolymer | 100 |
| Reinforcing agent | 10–60 |

In addition other ingredients can be included as follows:

| | Parts by weight |
|---|---|
| Plasticizer | 0–200 |
| Wetting agent | 0–10 |
| Antioxidant | 0–3 |
| Vulcanization accelerator | 0–5 |
| Sulfur | 0–2 |
| Quaternizing agent | 0–25 |
| Metal oxide | 0–5 |

In general, any rubber plasticizer can be employed in the binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxaundecyl)methane, and dioctyl phthalate are suitable plasticizers. Materials which provide a rubber having good low temperature properties are preferred. It is also frequently preferred that the plasticizers be oxygen-containing materials.

One presently preferred plasticizer is a liquid polybutadiene prepared by mass polymerization in the presence of finely divided sodium as the catalyst according to the method of Crouch 2,631,175. Broadly, such plasticizers which can be used in accordance with this invention comprise liquid polymers prepared from conjugated diolefin hydrocarbons such as 1,3-butadiene and isoprene, the liquid polymers having a viscosity of 100 to 5000 Saybolt Furol seconds at 100° F. Polymers having a viscosity from about 1000 to about 2500 Saybolt Furol seconds are presently preferred. These liquid polymers can be prepared by emulsion polymerization using large amounts of modifiers in accordance with the teaching of Frolich et al. 2,500,983 although, they are preferably prepared by the method set forth in Crouch 2,631,175. The latter method comprises mass polymerization in the presence of finely divided alkali metal and/or alkali metal hydride such as sodium, potassium, lithium, sodium hydride, potassium hydride and lithium hydride. Polymers thus prepared contain no modifiers or viscosity controlling agent and they are also free of materials which would act as inhibitors such as antioxidants and shortstops. Finely divided catalyst is used, preferably having a particle size below 200 microns, and generally below 100 microns in the range of 40 to 80 microns. The amount of catalyst employed usually does not exceed 2 parts by weight of the total monomer charged, preferably in the range of 0.5 to 1.5 parts by weight per 100 parts monomer. A more complete description of the process is set forth in the Crouch patent identified above.

Another presently preferred plasticizer for use in the propellant compositions of the invention is Philrich 5, a rubber extender and process oil available commercially from Phillips Petroleum Company. Said Philrich 5 is a highly aromatic heavy petroleum residual oil. Typical tests on said Philrich 5 are:

| | |
|---|---|
| Gravity, ° API | 11.6 |
| Viscosity, SUV, @ 210° F. | 175 |
| Aniline point, ° F. | 110 |
| Rostler analysis, wt. percent (IEC 41, 598 (1949)): | |
| Asphaltenes | 0.0 |
| Nitrogen bases | 11.0 |
| First acidaffins | 19.0 |
| Second acidaffins | 61.0 |
| Paraffins | 9.0 |

Wetting agents aid in deflocculating or dispersing the oxidizer. Aerosol OT (dioctyl ester of sodium sulfosuccinic acid), lecithin, and Duomeen C diacetate (the diacetate of trimethylenediamine substituted by a coconut oil product) are among the materials which are applicable.

Antioxidants which can be employed include Flexamine (physical mixture containing 65 percent of a complex diarylamine-ketone reaction product and 35 percent of N,N' - diphenyl-p-phenylenediamine), phenyl-beta-naphthylamine, 2,2 - methylene-bis(4-methyl-6-tert-butylphenol), and the like. Rubber antioxidants, in general, can be employed or if desired can be omitted.

Examples of vulcanization accelerators are those of the carbamate type, such as N,N-dimethyl-S-tert-butylsulfenyl dithiocarbamate and Butyl-Eight. Butyl-Eight is a rubber accelerator of the dithiocarbamate type supplied by the R. F. Vanderbilt Company and described in "Handbook of Material Trade Names" by Zimmerman and Lavine, 1953 edition, as a brown liquid; specific gravity 1.01; partially soluble in water and gasoline; and soluble in acetone, alcohol, benzol, carbon disulfide and chloroform.

It is to be understood that each of the various types of compounding ingredients can be used singly or mixtures of various ingredients performing a certain function can be employed. It is sometimes preferred, for example, to use mixtures of plasticizers rather than a single material.

Oxidizers which are applicable in the solid propellant compositions of this invention are those oxygen-containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium perchlorate, lithium chlorate, calcium nitrate, barium perchlorate, and strontium chlorate. Mixtures of oxidizers are also applicable. In the preparation of the solid rocket propellant compositions, the oxidizers are ground to a particle size, preferably within the range between 20 and 200 microns average particle size. The most preferred particle size is from 40–60 microns. The amount of solid oxidizer used is a major amount of the total composition and is in the range of 75 to 96 percent by weight of the total propellant composition.

When ammonium nitrate is used as the oxidant component, a phase stabilized ammonium nitrate is frequently used. One method of phase stabilizing ammonium nitrate is to admix about 10 parts of a potassium salt (usually potassium nitrate) with about 90 parts of ammonium nitrate, along with some water, heating the mixture to about 140° F., dry, and then grind to the desired particle size.

It is also within the scope of the invention to employ organic oxidizing salts as a portion of the oxidizer component. Examples of said organic oxidizing salts include, among others, cyanoguanadine, nitroguanadine, and guanadine nitrate. Said organic oxidizing salts function as a burning rate depressant when used in conjunction with the solid inorganic oxidizing salts. Said organic oxidizing salt can comprise from 5 to 15 weight percent of the total propellant composition. The organic oxidizing salt replaces a like amount of the inorganic oxidizing salt. Thus, the total amount of solid oxidizing salt in the propellant composition remains within the range 75 to 96 weight percent of the total composition.

In some instances it is desirable to employ a burning rate catalyst in the propellant compositions of the invention. Any suitable burning rate catalyst can be used in the propellant compositions of the invention. Burning rate catalysts applicable in the invention include ammonium dichromate and metal ferrocyanides and ferricyanides. Ferric ferrocyanides, such as Prussian, Berlin, Hamburg, Chinese, Paris, and milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide (Turnbull's blue) is also applicable. A particularly effective burning rate catalyst is milori blue which is pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used in the propellant compositions of the invention can be within the range of 0 to 12 weight percent, preferably within the range of 0 to 5 weight percent of the total composition.

The various ingredients in the propellant composition can be mixed on a roll mill, or an internal mixer such as a Banbury or a Baker-Perkins mixer can be employed. It is usually desirable to carry out the mixing or the incorporation of the thermosetting resin into the copolymer at elevated temperatures of the order of 170 to 190° F. in order that the resin can be smoothly and stably incorporated into the copolymer. The temperature at which said mixing is carried out should be below the temperature at which curing or thermosetting of the copolymer and/or the thermosetting resin will occur during the time the mixing is being carried out. One convenient procedure for blending the propellant ingredients is to mill the copolymer initially on a cold roll mill for a few minutes in order to break it down and then introduce the resinous material into the working bank of the copolymer on the mill to form an even mixture. After said mixture is formed, the temperature of the rolls of the mill is raised to about 170 to 190° F. and the resinous material is smoothly and stably incorporated into the copolymer. The remainder of the ingredients of the propellant composition can then be added to the mixture in any suitable manner. One convenient method is to mix in the remainder of the binder ingredients and then incorporate the oxidizer component, burning rate catalyst, etc., either as the remainder of said binder ingredients are being incorporated into the copolymer-resin blend, or after all of the binder ingredients have been mixed in. In the finished propellant, the binder component forms a continuous phase with the oxidizer component as a discontinuous phase. As mentioned above, the mixing or milling operation can be carried out employing types of mills other than roll mills, such as Baker-Perkins mixers, Banbury mixers, and the like, provided, of course, that heat be supplied at some time during the milling or mixing operation.

After mixing of the propellant ingredients has been carried out as described above, the composition can be compression molded or extruded into any desired shape or configuration. The grains of propellant are then cured. The curing temperature will be limited by the oxidizer in some instances but will generally be in the range between 70 and 240° F. Curing can be effected at atmospheric pressure or at superatmospheric pressures. It is usually preferred to cure at about atmospheric pressure.

The following example will serve to further illustrate the invention.

EXAMPLE

A propellant composition using a copolymer of 1,3-butadiene and 2-methyl-5-vinylpyridine, Schenectady Resin No. 6601 (an uncured phenol-formaldehyde resin available commercially from the Schenectady Varnish Company, Schenectady, New York) and the other ingredient shown below was prepared.

| Ingredient | Parts per 100 Parts Copolymer | Weight Percent |
| --- | --- | --- |
| Binder Component: | | |
| Bd/MVP Copolymer (85/15) | 100 | 5.1 |
| Schenectady Resin No. 6601 | 44 | 2.2 |
| Flexamine | 6 | 0.3 |
| Butarez-25 ᵃ | 100 | 5.1 |
| Philrich 5 | 40 | 2.0 |
| p-Xylene Hexachloride | 6 | 0.3 |
| Oxidizer Component: | | |
| Cyanoguanadine | | 10.0 |
| Ammonium Nitrate | | 75.0 |
| | | 100.0 |

ᵃ Butarez-25 is a liquid polybutadiene, prepared by sodium catalyzed polymerization in heptane and having a Saybolt Furol viscosity (SFS) at 100° F. of approximately 2500 seconds. Further details regarding the preparation of said Butarez-25 and other suitable liquid polybutadienes can be found in Patent 2,631,175 issued March 10, 1953, to W. W. Crouch.

The above propellant composition after being cured as indicated below was tested for physical tests and ballistic tests. The results of said tests are given in Table I below.

Table I

BALLISTIC AND PHYSICAL TEST DATA

| Physical Properties | Percent Elongation | Tensile | Modulus |
| --- | --- | --- | --- |
| Cured 24 hrs. @ 190° F | 2.8 | 221 | 13,321 |
| Oven Aged: | | | |
| 1 week @ 190° F | 2.0 | 190 | 16,600 |
| 2 weeks @ 190° F | 3.0 | 226 | 29,400 |
| Impact Sensitivity—91 in./lb. | | | |
| Density—0.0534. | | | |
| Ballistic Properties: | | | |
| Burning Rate, r, @ 500 p.s.i | 0.036 in./sec. | | |
| Burning Rate, r, @ 1,000 p.s.i | 0.058 in./sec. | | |
| Pressure Exponent (n) | 0.69. | | |
| πp−20° F. to 100° F | 0.11%/° F. | | |

As will be evident to those skilled in the art, various modifications of the invention can be made or followed in the light of the above disclosure without departing from the spirit or scope of the invention.

The above propellant composition represents a specific example of a presently preferred propellant according to the invention. Based on the specific ingredients of said propellant, a presently preferred propellant composition according to the invention would have a composition consisting of: from 80 to 90 weight percent of an oxidizer component and from 20 to 10 weight percent of a binder component; said oxidizer component consisting of: from 85 to 100 weight percent of ammonium nitrate and from 0 to 15 weight percent of cyanoguanadine; and said binder component consisting of: a copolymer of 1,3-butadiene with 2-methyl-5-vinylpyridine; from 40 to 50 parts by weight per 100 parts by weight of said copolymer of an uncured phenol-formaldehyde thermosetting resin; from 5 to 7 parts by weight per 100 parts by weight of said copolymer of an antioxidant consisting essentially of a physical mixture containing 65 weight percent of a complex diarylamine-ketone reaction product and 35 weight percent of N,N'-diphenyl-p-phenylenediamine; from 80 to 100 parts by weight per 100 parts by weight of said copolymer of a liquid polybutadiene; from 10 to 50 parts by weight per 100 parts by weight of said copolymer of a rubber extender consisting essentially of a highly aromatic heavy petroleum residual oil; and about 6 parts by weight per 100 parts of said copolymer of para-xylene hydrochloride.

We claim:

1. A solid propellant composition consisting essentially of: from 75 to 96 weight percent of an oxidizer component selected from the group consisting of solid inorganic oxidizing salts, and mixtures of said solid inorganic oxidizing salt with an organic oxidizing salt present in an amount within the range of 5 to 15 weight percent based on the total propellant composition; and from 4 to 25 weight percent of a binder component comprised of: a copolymer of (a) a conjugated diene containing from 4 to 10 carbon atoms per molecule and (b) a

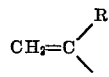

substituted heterocyclic nitrogen base selected from the group consisting of pyridine, quinoline, alkyl substituted pyridine, and alkyl substituted quinoline wherein the total number of carbon atoms in the nuclear alkyl substituents is not more than 15, and wherein R is selected from the group consisting of hydrogen and a methyl radical; and 10 to 60 parts by weight per 100 parts by weight of said copolymer of an uncured thermosetting resinous condensate of an aldehyde selected from the group consisting of formaldehyde, acetaldehyde, propionaldehyde and benzaldehyde with a compound selected from the group consisting of phenol, the cresols, the xylenols, resorcinol, urea, and melamine, and mixtures thereof.

2. The composition of claim 1 wherein said resinous condensate is a phenol-formaldehyde resin.

3. The composition of claim 1 wherein said resinous condensate is a urea-formaldehyde resin.

4. The composition of claim 1 wherein said resinous condensate is a melamine-formaldehyde resin.

5. The composition of claim 2 wherein said conjugated diene is 1,3-butadiene and said heterocyclic nitrogen base is 2-methyl-5-vinylpyridine.

6. The composition of claim 3 wherein said conjugated diene is 1,3-butadiene and said heterocyclic nitrogen base is 2-methyl-5-vinylpyridine.

7. The composition of claim 4 wherein said conjugated diene is 1,3-butadiene and said heterocyclic nitrogen base is 2-methyl-5-vinylpyridine.

8. The composition of claim 1 wherein said oxidizer component is a mixture consisting essentially of an organic oxidizer salt and ammonium nitrate, said organic oxidizer salt being present in an amount of from 5 to 15 weight percent, based on the total propellant composition.

9. The composition of claim 8 wherein said organic oxidizer salt is cyanoguanadine.

10. The composition of claim 8 wherein said organic oxidizer salt is nitroguanadine.

11. The composition of claim 8 wherein said organic oxidizer salt is guanadine nitrate.

12. A solid propellant composition consisting essentially of: from 75 to 96 weight percent of an oxidizer component selected from the group consisting of solid inorganic oxidizing salts, and mixtures of said solid inorganic oxidizing salt with an organic oxidizing salt present in an amount within the range of 5 to 15 weight percent based on the total propellant composition; from 0 to 12 weight percent of a suitable burning rate catalyst; and from 4 to 25 weight percent of a binder component comprised of: a copolymer of (a) a conjugated diene containing from 4 to 10 carbon atoms per molecule and (b) a

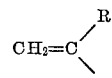

substituted heterocyclic nitrogen base selected from the group consisting of pyridine, quinoline, alkyl substituted pyridine, and alkyl substituted quinoline wherein the total number of carbon atoms in the nuclear alkyl substituents is not more than 15, and wherein R is selected from the group consisting of hydrogen and a methyl radical; and 10 to 60 parts by weight per 100 parts by weight of said copolymer of an uncured thermosetting resinous condensate of an aldehyde selected from the group consisting of formaldehyde, acetaldehyde, propionaldehyde, and benzaldehyde with a compound selected from the group consisting of phenol, the cresols, the xylenols, resorcinol, urea, and melamine.

13. A solid propellant composition consisting of: from 80 to 90 weight percent of an oxidizer component and from 20 to 10 weight percent of a binder component; said oxidizer component consisting of: from 85 to 100 weight percent of ammonium nitrate and from 0 to 15 weight percent of cyanoguanadine; and said binder component consisting of: a copolymer of 1,3-butadiene with 2-methyl-5-vinylpyridine; from 40 to 50 parts by weight per 100 parts by weight of said copolymer of an uncured phenol-formaldehyde thermosetting resin; from 5 to 7 parts by weight per 100 parts by weight of said copolymer of a suitable antioxidant; from 80 to 100 parts by weight per 100 parts by weight of said copolymer of a liquid polybutadiene; from 10 to 50 parts by weight per 100 parts by weight of said copolymer of a rubber extender consisting essentially of a highly aromatic heavy petroleum residual oil; and about 6 parts by weight per 100 parts of said copolymer of para-xylene hexachloride.

14. A solid propellant composition consisting of: about 75 weight percent of ammonium nitrate; about 10 weight percent of cyanoguanadine; about 0.3 weight percent of paraxylene hexachloride; about 2 weight percent of a rubber extender consisting essentially of a highly aromatic heavy petroleum residual oil; about 5.1 weight percent of a liquid polybutadiene; about 0.3 weight percent of a suitable antioxidant; about 2.2 weight percent of an uncured phenol-formaldehyde thermosetting resin; and about 5.1 weight percent of a copolymer of 1,3-butadiene with 2-methyl-5-vinylpyridine.

References Cited in the file of this patent

UNITED STATES PATENTS

| 2,622,277 | Bonell et al. | Dec. 23, 1952 |
| 2,742,672 | Thomas | Apr. 24, 1956 |
| 2,857,258 | Thomas | Oct. 21, 1958 |
| 2,877,504 | Fox | Mar. 17, 1959 |

OTHER REFERENCES

Chem. and Eng. News, October 7, 1957, pp. 62–63.

"Jet Propulsion," Air Technical Service Command, 1946, p. 158.

Elder: Interavia, vol. 12, No. 8, August 1957, page 801.